May 31, 1932.  P. B. CASON  1,861,111
AUXILIARY AXLE ATTACHMENT FOR MOTOR VEHICLES
Filed July 18, 1930  3 Sheets-Sheet 1
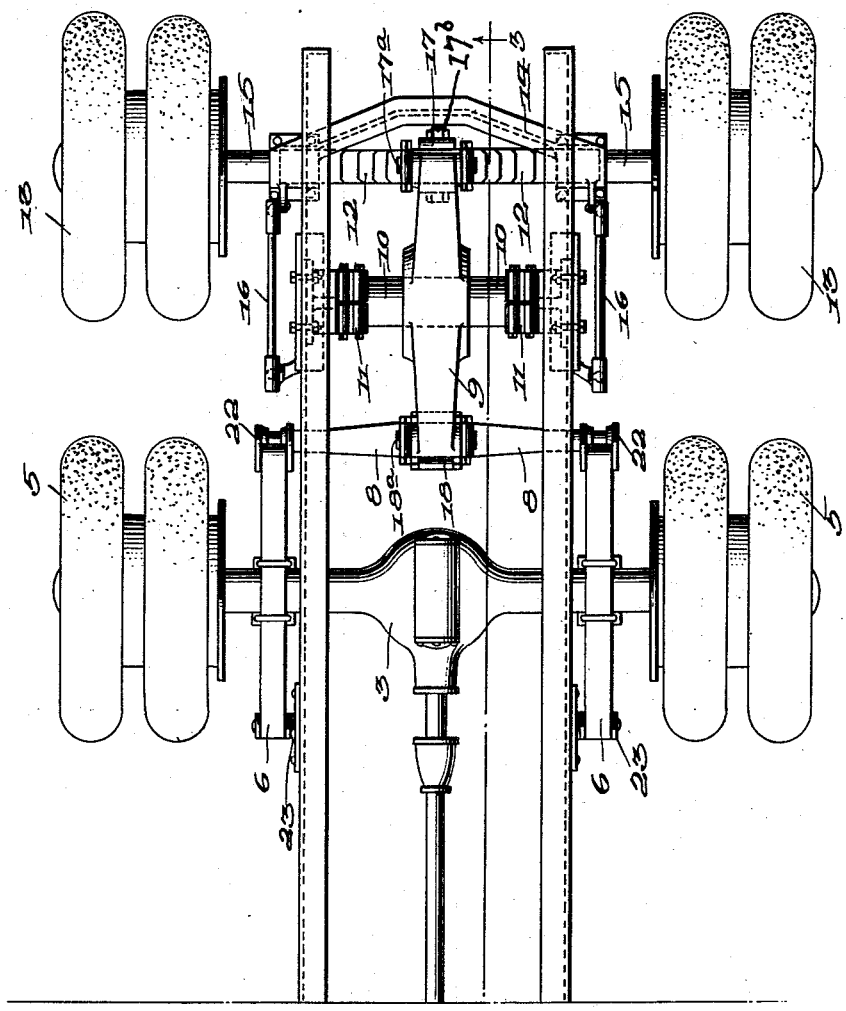
Fig. 1.
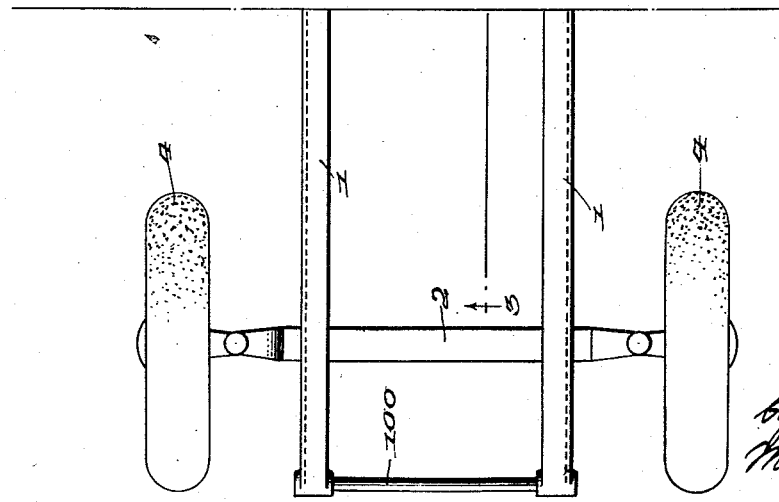
Inventor
P. B. Cason,
by
Mason & Mason,
Attorneys.

May 31, 1932.　　　P. B. CASON　　　1,861,111
AUXILIARY AXLE ATTACHMENT FOR MOTOR VEHICLES
Filed July 18, 1930　　　3 Sheets-Sheet 2
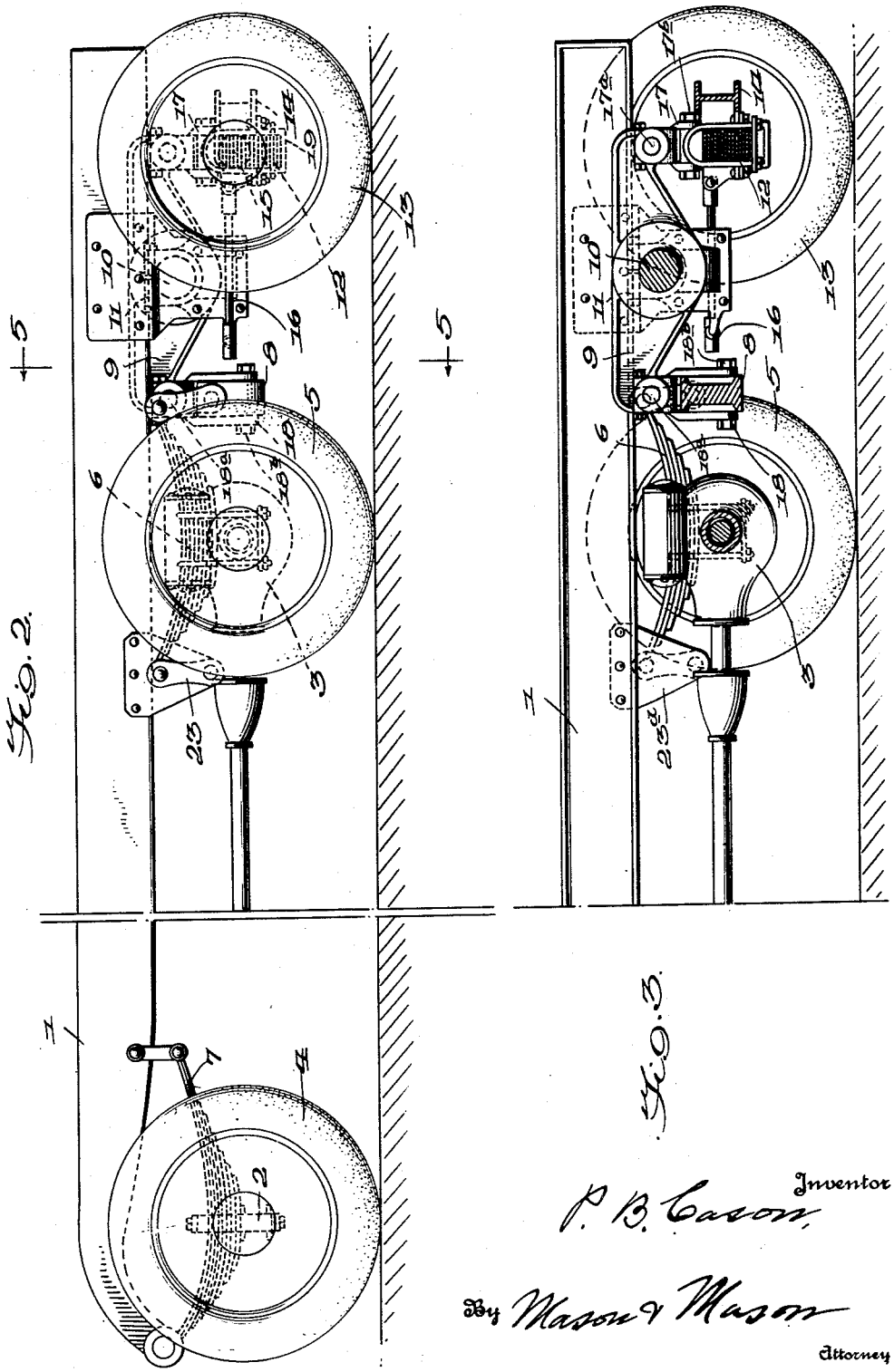
Inventor
P. B. Cason
By Mason & Mason
Attorneys May 31, 1932.  P. B. CASON  1,861,111
AUXILIARY AXLE ATTACHMENT FOR MOTOR VEHICLES
Filed July 18, 1930  3 Sheets-Sheet 3
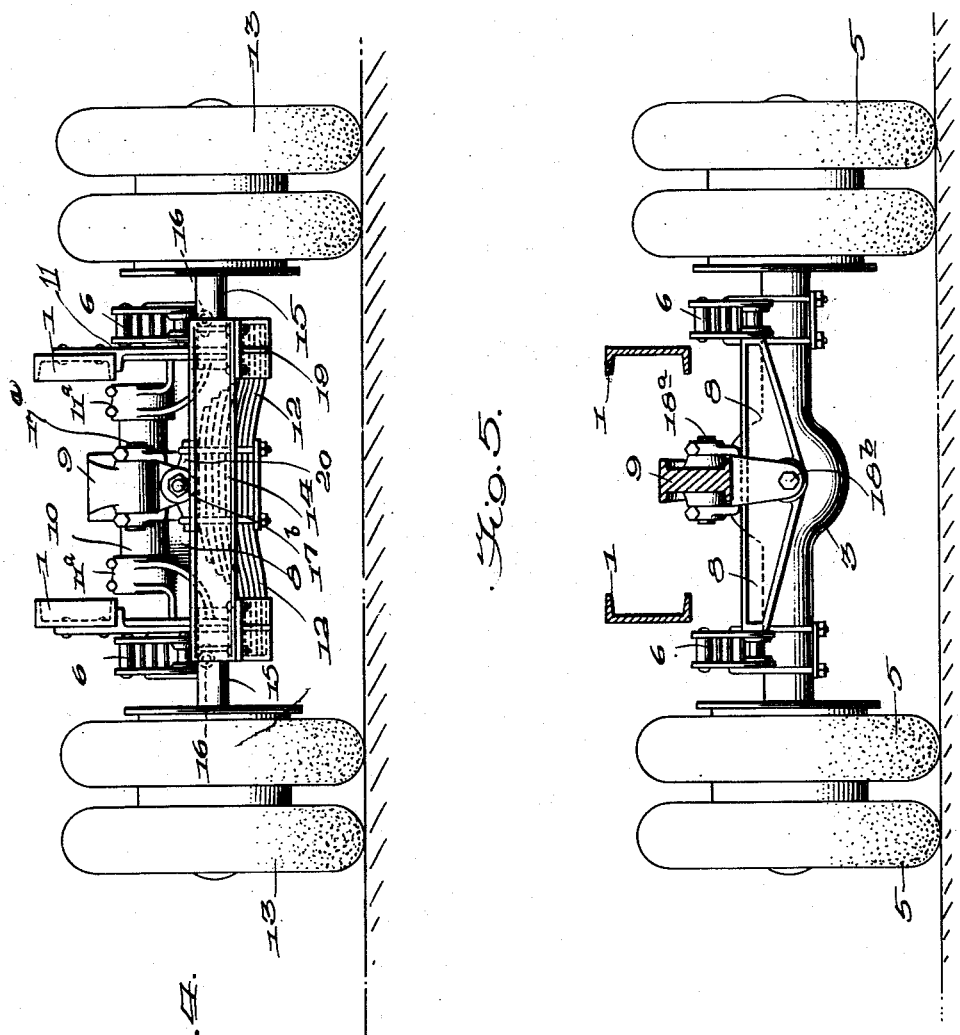

Patented May 31, 1932

1,861,111

UNITED STATES PATENT OFFICE

PAUL B. CASON, OF NEW HAVEN, CONNECTICUT, ASSIGNOR TO THE CASON SIX WHEEL ATTACHMENT COMPANY, OF NEW HAVEN, CONNECTICUT, A CORPORATION OF CONNECTICUT

AUXILIARY AXLE ATTACHMENT FOR MOTOR VEHICLES

Application filed July 18, 1930. Serial No. 468,924.

This invention relates to auxiliary or six-wheel axle attachments for motor trucks.

In order to provide for the very heavy loads carried by motor vehicles, especially trucks, the use of an auxiliary axle located to the rear of the main rear axle of the vehicle to which power is applied has been provided, carrying two additional wheels. This auxiliary, or six-wheel attachment axle, assists in dividing the load sustained upon the truck body between two axles and their corresponding pairs of wheels, thereby reducing the weight upon the main rear drive axle. The chassis or frame consists ordinarily of two side rails connected at intervals by cross members, a front axle assembly placed transversely and connected to the frame side rails by leaf springs attached at front and rear to said side rails, and a rear axle, which may be power-driven in the case of a self-propelled vehicle, or not power-driven in the case of a trailer. The front and rear axles carry the usual wheels.

The foregoing parts constitute a motor truck or trailer chassis, the rear axle being ordinarily attached to the frame through two leaf springs secured to the axle intermediate of their ends, and having their front ends connected pivotally to the chassis side members. An object of the present invention is the provision of means whereby the auxiliary axle is attached to the chassis behind the rear axle so as to permit the auxiliary axle to have such freedom of movement in response to irregularities of the road as to overcome the tendency to distort the frame, the springs torsionally, and the connections between the axle and springs, due to torsional and other strains, whereby breakage or undue strain upon the parts is prevented.

The connecting devices between the auxiliary axle and the frame and the rear or drive axle proper, whereby such unrestricted freedom of movement is permitted, constitutes the important features of novelty of the present invention.

In the embodiment of the invention, as herein illustrated, the auxiliary axle sustains its portion of the weight resting upon the chassis through a leaf spring, to which spring is connected one end of a longitudinally extending rocker arm, fulcrumed to a bar extending transversely of the frame members, and having its rear end connected centrally with a transversely extending rocker arm. The connection between the rear end of the first-mentioned rocker arm and the leaf spring, and the connection between its front end and the transverse rocker arm, are in the form of pivotal joints capable of rocking movements in directions at right angles to each other. The two ends of the transversely extending rocker arm are in turn connected with the rear ends, respectively, of the two leaf springs sustained by the rear axle, which have their forward ends connected by the usual spring shackles with the side frame members of the chassis.

The organization above referred to, whether in the precise form stated, or with suitable variations as to the details thereof which embody the same principles of action, permits relative tilting movements of the auxiliary axle relative to the chassis, and also bodily movements about an axis extending transversely of the chassis of such auxiliary axle, relative to the main drive axle, but independently of the latter. As before stated, the movements described obviate all torsional or other strains due to irregularities in the road bed, which would cause a twisting, bending or undue straining of the auxiliary axle or its connections through the springs, referred to, with the main rear axle of the vehicle.

The following detailed description, when considered in connection with the accompanying drawings, will convey a clear idea of the construction and mode of operation of a preferred form of the invention.

In the drawings:

Fig. 1 is a plan view of a truck chassis embodying the invention;

Fig. 2 is a side elevation thereof;

Fig. 3 is a sectional elevation of the rear truck, including the auxiliary axle, on the line 3—3 of Fig. 1;

Fig. 4 is a rear elevation of the parts shown in Fig. 1, and

Fig. 5 is a transverse sectional view on the line 5—5 Fig. 2.

The chassis frame members 1, which may be of the usual form and comprise parallel longitudinal beams of preferably the cross section as shown in Fig. 5, are connected by one or more transverse tie bars 100. The usual front axle 2, with wheels 4 may support the front end of the frame through springs 7, and the rear or drive axle assembly 3 supports its portion of the load through leaf springs 6, having their forward ends connected by shackles 23, to suitable brackets 23d, depending from the frame. The rear ends of the springs 6 are connected rigidly with shackles 22 which shackles are pivotally connected with a transversely-extending bar member 8, of any preferred cross-section, which is supported intermediate its length by a pivot member 18a extending across arms of a yoke 18, which latter carries a transversely arranged pivot 18b, pivotally supporting bar 8 from one end of a longitudinally arranged rocker arm 9.

The rocker arm 9 is fulcrumed intermediate its ends on a cross member 10 whose ends are rigidly supported in the inwardly extending arms 11a of brackets 11, the latter being bolted or otherwise rigidly secured to the frames 1. Suitable bearings are provided between the cross member 10 and the rocker arm 9, whereby the latter may freely tilt upon the former as a fulcrum, due to movements imparted thereto from the axles 3 and 14—15, due to the inequalities of the road.

The rear end of the rocker 9 is connected through transversely arranged pivots 17a and 17b, carried by a connecting yoke 17, with the central upper portion of the rear leaf spring 12, the connection described providing for pivotal movements between the rocker 9 and spring 12 in directions transversely and longitudinally of the vehicle.

The leaf spring 12 is herein shown as supported at its ends for free longitudinal movements, due to its elongation and contraction under varying load conditions, in boxes or containers 19 which depend from and are bolted to the underside of the ends of the rearwardly deflected section 14 of the auxiliary axle. This axle comprises a central rearwardly deflected portion 14 and two spindles 15, 15 which latter respectively support the auxiliary wheels 13, 13.

The rocker 9 is fulcrumed on the bar 10 at a point intermediate its ends which provides for such relative length of arms on opposite sides of the fulcrum as to proportion the correct amount of load transmission to the chassis, rear axle 3 and auxiliary axle 14, 15. The arrangement described provides for permitting the springs 6 to move vertically simultaneously with the rise and fall of the axle 3 relative to the frame side members 1, and no torsional movements are introduced into the springs 6, the axle 3, or the members connecting these parts. The yoke 18 and its transversely arranged pivots connecting the cross bar 8 intermediate its ends with the rocker 9, provides for a certain amount of movement longitudinally the chassis of the cross bar 8 as the distance between the ends of the springs 6 is increased or decreased under the expansion and contraction of the springs, due to variations in load pressure conditions.

It will be seen also that the auxiliary axle assembly herein described comprises the axle 14 and the two spindles 15 on which the wheels 13 are rotatably mounted. The auxiliary axle is spaced from the brackets 11 and held in alignment relative to the frame members 1, and parallel to the drive axle 3, by radius rods 16 extending between the brackets and the auxiliary axle, as shown. These radius rods have free pivotal connections with the brackets 11 and auxiliary axle so as to permit vertical movements of the auxiliary axle, or either end of the axle, while maintaining the latter in its proper relation to the frame and rear axle 3, as above pointed out.

The leaf spring 12, mounted transversely relatively to the chassis frame 1, and parallel and in the same vertical plane as the spindles 15 of the auxiliary axle 14, 15, has its opposite ends supported by and housed within the containers 19 and clamped tightly in composition blocks therein. The two lower leaves of the spring extend into these containers, which are preferably in the form of steel boxes, bolted to either end of the axle bed 14. No provision for movement is made at these points other than to allow the spring ends their natural movements, due to the deflection of the spring under variations of load.

The connection between the rocker 9 and the spring 12 is herein shown as made through a spring saddle or seat 20, which latter is connected by the longitudinal pivot bolt 17b, to the yoke 17, the latter being in turn connected by the transverse pivot bolt 17a with the rear arm of the rocker. This connection permits freedom of movement of the spring 12, following from expansion and contraction under variations of load, vertically due to the upward and downward movements of the rocker arm 9, and laterally about the pivotal axis of the pivot 17b. The construction of the spring 12 and the means of attaching its ends to the axle 14 provides an adequate torque reaction during the periods of brake application.

The construction of the auxiliary axle 14, 15, and the arrangement whereby the spring 12 is located in the same vertical plane as the axis of the spindles 15, and below their centers, is an important feature of the invention. It provides for a low center of gravity on the spring loading, permits maximum clearance between the axle 14 and the frame 1, and assists materially in the absorption of the torque reactions set up by the application of the brakes on the wheels 13.

While I have herein shown a construction which embodies the principles of the invention in its preferred form, it is to be understood that variations both as to form and arrangement of the several elements may be made without departing from the scope of the invention, as set forth in the following claims.

I claim:—

1. In a six-wheel attachment for vehicles, the combination of a frame, a rear axle, parallel side springs between said axle and frame, a longitudinal rocker arm fulcrumed intermediate the longitudinal members of the frame, of a cross member pivotally connected at a point intermediate its ends with the forward end of said rocker, shackles rigidly mounted on the rear ends of said springs and pivotally connected with said cross member, and a yielding connection between the auxiliary axle and the rear end of said rocker.

2. In a six-wheel attachment for vehicles, the combination of a frame, a rocker arm supported therefrom, a rear axle, parallel springs between said frame and axle, a cross member connecting the rear ends of said spring, transverse pivotal connections between the forward end of said rocker arm and cross member, an auxiliary axle, a transverse spring connected with said auxiliary axle, and pivotal connections between the rear end of said rocker arm and said transverse spring.

3. In a six-wheel attachment for vehicles, the combination of a frame, front and rear axles, an auxiliary axle, a rocker arm fulcrumed in said frame, springs between said frame and rear axle, flexible connections between said springs and one end of said rocker arm, a transverse spring attached at either end to, and in the same vertical plane with and below the centers of, the auxiliary axle and parallel with said axle, and pivotal connections between said rocker arm and transverse spring.

4. In a six-wheel attachment for vehicles, the combination of a frame, front and rear axles, springs between said axles and frame, a rocker arm pivoted to the frame, flexible pivotal connections between the front end of said arm and the rear axle springs, an auxiliary axle comprising spindles in line for supporting the wheels and an intermediate portion deflected rearwardly at its center from a vertical plane through the axes of said spindles, a leaf spring located forward of said deflection and in line with said spindles, said spring being disposed parallel with said spindles and lying below and in the same vertical plane with the axes of said spindles, and pivotal connections between the rear end of said rocker and said spring.

5. In a six-wheel attachment for vehicles, the combination of a frame, front and rear axles, springs between said frame and axles, a rocker arm pivotally supported from said frame, a transverse member connecting one end of said rocker with the rear ends of the rear axle springs, an auxiliary axle comprising spindles in line and a central portion deflected rearwardly from the axes of said spindles, a leaf spring located parallel with said spindles, containers supported from said auxiliary axle and housing the ends of said leaf spring and arranged to permit free movements of said spring ends to accommodate said spring end deflections caused by varying load conditions, and pivotal connections between the rear end of the rocker arm and said leaf spring.

6. In a six-wheel attachment for vehicles, the combination of a frame, front and rear axles and their springs, an auxiliary axle, a spring supported therefrom, a single rocker pivotally supported from the frame and flexibly connected with the auxiliary axle spring, and a cross member connecting the opposite end of said rocker with the rear ends of the rear axle springs.

7. In a six-wheel attachment for vehicles, the combination of a frame, a rear axle, side springs between said axle and frame, connections between the forward ends of said springs and frame, an auxiliary axle, a transverse spring supported from the latter in a plane below said axle, a rocker pivotally supported from the frame, a cross member connecting said rocker with the rear ends of the rear axle springs, and pivotal connections between said rocker and auxiliary axle spring.

8. In a six-wheel attachment for vehicles, the combination of a frame, rear and auxiliary axles, springs between the rear axle and frame, brackets connected with the frame, a bar supported from said brackets, a rocker pivotally mounted on said bar, a cross member pivoted intermediate its ends to said rocker, pivotal connections between the ends of said member and the rear ends of the rear axle springs, means connecting the rear end of the rocker with the auxiliary axle spring, and radius rods connecting said auxiliary axle and brackets.

9. In a six-wheel attachment for vehicles, the combination with a chassis, of a rear axle and its springs, an auxiliary axle, a spring supported therefrom, a rocker pivotally supported from the frame and connected at its rear end to the auxiliary axle spring, and radius rods connecting said frame and auxiliary axle, the construction being such as to provide connection at three points only between the chassis and auxiliary axle.

10. In a six-wheel attachment for vehicles, an auxiliary or six-wheel axle, comprising spindles in line, and a rearwardly deflected or offset intermediate portion, spring end containers supported from said axle in a vertical plane through the axes of the spindles, a leaf spring parallel with said spindles and having its ends supported in said containers, the arrangement of said parts being such that the offset portion of the axle is located horizontally to the rear of the spring so that its center clears the spring.

11. In a six-wheel attachment for vehicles, the combination with a chassis, of front and rear axles, springs between said chassis and axles, an auxiliary axle, a leaf spring supported thereby, and connections between the rear ends of the rear or drive axle side springs and the auxiliary axle spring, said connections including two transversely arranged pivotally supported members constructed to permit free pivotal movements of the auxiliary axle about an axis longitudinal of the chassis and also bodily movements longitudinal of the chassis.

In testimony whereof I have hereunto set my hand this 14th day of July A. D. 1930.

PAUL B. CASON.